United States Patent
Alasti et al.

(10) Patent No.: US 12,160,907 B2
(45) Date of Patent: *Dec. 3, 2024

(54) DYNAMIC ALLOCATION OF BANDWIDTH IN 5G WIRELESS NETWORK

(71) Applicant: DISH Wireless L.L.C., Englewood, CO (US)

(72) Inventors: Mehdi Alasti, Reston, VA (US); Siddhartha Chenumolu, Ashburn, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,587

(22) Filed: Aug. 17, 2023

(65) Prior Publication Data
US 2023/0403748 A1    Dec. 14, 2023

Related U.S. Application Data

(63) Continuation of application No. 17/566,945, filed on Dec. 31, 2021, now Pat. No. 11,765,777.

(51) Int. Cl.
*H04W 74/0833*    (2024.01)
*H04W 56/00*    (2009.01)
(Continued)

(52) U.S. Cl.
CPC ..... *H04W 74/0841* (2013.01); *H04W 56/001* (2013.01); *H04W 72/044* (2013.01);
(Continued)

(58) Field of Classification Search
CPC ........... H04W 74/0841; H04W 56/001; H04W 72/044; H04W 74/006; H04W 74/0866; H04W 84/042

See application file for complete search history.

(56) References Cited

U.S. PATENT DOCUMENTS 5,303,287 A * 4/1994 Laborde ................ H04W 16/32
                                                                 455/449
5,677,905 A * 10/1997 Bigham .............. H04L 49/3081
                                                                348/E7.071
(Continued)

FOREIGN PATENT DOCUMENTS

CN    109618413 A    4/2019
EP    3416429 A1    12/2018

OTHER PUBLICATIONS

PCT International Search Report for International Application No. PCT/US2022/082642 dated Apr. 29, 2023 (4 pages).
(Continued)

*Primary Examiner* — Kashif Siddiqui
(74) *Attorney, Agent, or Firm* — KW Law, LLP

(57) ABSTRACT

Spectrum and radio resources associated with a 5G radio unit (RU) of a host network are dynamically allocated amongst one or more guest networks. A provisioning plane receives inputs from a guest network operator that identifies desired times, locations and/or frequency bands for desired network coverage. The provisioning plane responsively identifies bandwidth allocations that meet the requested parameters for exclusive use by the guest network. User equipment (UE) associated with each guest network maintains time and frequency synchronization with the host network, but otherwise limits its communications to the frequency bands allocated to the guest network. By dynamically obtaining physical radio and spectrum resources from a host provider and by scaling backend network capabilities using cloud resources, guest networks for any number of different purposes can be quickly deployed or modified as desired.

20 Claims, 7 Drawing Sheets

(51) Int. Cl.
   *H04W 72/044* (2023.01)
   *H04W 74/00* (2009.01)
   *H04W 74/08* (2024.01)
   *H04W 84/04* (2009.01)

(52) U.S. Cl.
   CPC ..... *H04W 74/006* (2013.01); *H04W 74/0866* (2013.01); *H04W 84/042* (2013.01)

(56) References Cited

U.S. PATENT DOCUMENTS

| | | | | |
|---|---|---|---|---|
| 11,765,777 | B2* | 9/2023 | Alasti | H04W 72/044 |
| | | | | 370/329 |
| 2004/0082314 | A1* | 4/2004 | Shaw | H04W 8/22 |
| | | | | 455/411 |
| 2006/0083205 | A1 | 4/2006 | Buddhikot | |
| 2008/0101302 | A1* | 5/2008 | Kotzin | H04W 16/32 |
| | | | | 370/335 |
| 2011/0182248 | A1* | 7/2011 | Fan | H04L 47/2433 |
| | | | | 370/329 |
| 2013/0303114 | A1 | 11/2013 | Ahmad et al. | |
| 2015/0131997 | A1* | 5/2015 | Syed | H04J 14/0256 |
| | | | | 398/69 |
| 2016/0198484 | A1* | 7/2016 | Skarp | H04W 28/20 |
| | | | | 370/329 |
| 2018/0091494 | A1* | 3/2018 | Ngo | H04L 63/0853 |
| 2018/0121249 | A1* | 5/2018 | Sanghavi | G06F 9/5077 |
| 2019/0132781 | A1* | 5/2019 | Arnold | H04W 72/0446 |
| 2019/0239154 | A1 | 8/2019 | Horn et al. | |
| 2019/0380128 | A1 | 12/2019 | Park et al. | |
| 2020/0305159 | A1 | 9/2020 | Raghothaman | |
| 2021/0092725 | A1 | 3/2021 | Park et al. | |
| 2021/0218744 | A1* | 7/2021 | Gandhi | H04L 63/062 |
| 2022/0225334 | A1* | 7/2022 | Xu | H04W 24/08 |

OTHER PUBLICATIONS

Written Opinion of the International Searching Committee for International Application No. PCT/US2022/082642 dated Apr. 29, 2023 (13 pages).

Aly S. Abdalla et al: "Toward Next Generation Open Radio Access Network—What O-RAN Can and Cannot Do!", arxiv.org, Cornell University Library, 201 Olin Library Cornell University Ithaca, NY 14853, dated Nov. 26, 2021 (8 pages).

* cited by examiner

DYNAMIC ALLOCATION OF BANDWIDTH IN 5G WIRELESS NETWORK

PRIORITY

This application is a continuation of Nonprovisional U.S. patent application Ser. No. 17/566,945 filed on Dec. 31, 2021, which is incorporated herein by reference.

TECHNICAL FIELD

The following generally relates to wireless data networks, such as 5G wireless networks. More particularly, the following relates to systems, devices and automated processes to adaptively share bandwidth within a 5G or similar wireless network amongst multiple guest networks.

BACKGROUND

Wireless networks that transport digital data and telephone calls are becoming increasingly sophisticated. Currently, fifth generation ("5G") broadband cellular networks are being deployed around the world. These 5G networks use emerging technologies to support data and voice communications with millions, if not billions, of mobile phones, computers and other devices. 5G technologies are capable of supplying much greater bandwidths than was previously available, so it is likely that the widespread deployment of 5G networks could radically expand the number of services available to customers.

Unlike prior data and telephone networks that relied upon proprietary designs, modern 5G networks generally comply with industry standards such as the Open Radio Access Network ("Open RAN" or "O-RAN") standard that describes interactions between the network and mobile phones and other devices associate with an operator of the network. The O-RAN model follows a virtualized model for a 5G wireless architecture in which 5G base stations ("gNBs") are implemented using separate centralized units (CUs), distributed units (DUs) and radio units (RUs). In a modern network, O-RAN CUs and DUs are often implemented using software modules executed by distributed (e.g., "cloud") computing hardware.

RUs, however, require a cell site with physical transmitters, antennas and the like at an actual geographic location. A major challenge to deploying a 5G network, then, is obtaining the necessary physical infrastructure. Even if certain backend computing functions can be virtualized and deployed fairly readily, it is still necessary to provide physical radio equipment (e.g., transmitters/receivers, antennas, filters, etc.) in each of the geographic locations where wireless coverage is desired. The logistical challenges of obtain access to spectrum, obtaining access to cell towers, supplying data service to the site and performing maintenance on the physical radio units can be an insurmountable burden, particularly for smaller network service providers.

Although some attempts have been made to share assigned spectrum between multiple networks, these have been met with various challenges. The so-called "neutral host" model, for example, allows one network provider to lease bandwidth on its own network to other parties. The neutral host generally recognizes the lessee's "roaming" traffic on its own network, and then forwards such traffic to the lessee, generally for a fee. In this model, however, the "neutral host" maintains full access and control of its own network, so the other providers that are leasing space on the network must relinquish a substantial amount of flexibility, security, and control over their data traffic. And even to the limited extent that some wireless providers may lease dedicated portions of their spectrum to other providers, this access still lacks the flexibility and independence that are generally desired from operating an independent network.

A substantial desire therefore exists to build systems, devices and automated processes that would facilitate convenient sharing of spectrum and radio equipment between multiple network operators. In particular, there is a need to flexibly and efficiently apportion spectrum and radio resources amongst multiple guest network operators while allowing the guest operators to independently deploy a wide range of network services.

BRIEF SUMMARY

Various embodiments provide 5G access on demand using a dynamic and flexible access on demand model. This model dynamically assigns radio resources (RUs, antennas, etc.) and electromagnetic spectrum in a manner that is uniquely tailored for customers' specific services. Unlike previous "neutral host" models, the R/SaaS model allows guest mobile network operators (MNOs) to instantiate their own virtualized network functions using dedicated spectrum without the need to obtain and manage the physical resources otherwise needed to support wireless communications. Guest MNOs (e.g., business enterprises, government entities and/or the like) can implement their own network services using, for example, their own 5G core, IP multimedia system (IMS), virtual CUs, virtual DUs, operations/business support system (OSS/BSS) and/or the like. These service modules communicate with user equipment (UE) via spectrum and radio capabilities that are granted by a network host. Guest network operators can maintain control over the virtualized backend modules that provide the actual network services without the host network needing access to the underlying data or limiting the services that are provided by the guest. Various embodiments therefore allow guest network operators to obtain spectrum on demand that can be used to manage complete 5G networks fit for their own target services. Such access can be delivered quickly and efficiently, without the guest network operator needing to obtain its own hardware, antennas, spectrum, etc.

This general concept enables a wide range of new network services that were previously impractical, if not impossible, to build. Enterprises and manufacturers, for example, could build and operate their own special-purpose 5G networks to support their own unique services while serving only the geographic locations and times that are needed. Public and/or private entities could develop their own 5G networks for public or private services without relying on legacy MNOs. Customized wireless networks can be created to serve sporting events, festivals or other public events by allocating spectrum only at the locations and times that the events occur. Similarly, customized networks could be quickly deployed to respond to specific emergency situations, natural disasters, police or fire situations and/or the like. Such networks may be deployed only for those times, locations and bandwidth ranges suited to the service needs of the particular event. Many other examples of dynamically-created guest network services could be equivalently implemented using the concepts described herein.

Dynamic allocation provides efficiency and flexibility for guest network providers. Guest network operators could modify their own network services or deploy new services simply by adapting their own backend infrastructure, without a need to involve the network host. This enables flexible and secure services to be quickly deployed for a wide range of guest network operators. Existing network services can be scaled upward or downward simply by modifying the cloud computing resources allocated to the service, thereby making very efficient use of computing resources. Costs can also be saved by allocating only spectrum and computing services at the times and places that they are needed.

Dynamic allocation also allows more efficient use of the entire spectrum operated by the host network. A business or factory, for example, may need additional bandwidth in certain locations during the workday that is not needed after working hours are over. This unneeded bandwidth could be reassigned to a video streaming service, for example, that sees greater demands during non-working hours. This dynamic adaptation of spectrum is particularly efficient when paired with cloud computing resources that can be scaled up or down as needed based upon the then-current services operating on the network. Dynamic allocation can also be used to avoid spectrum fragmentation caused by non-contiguous spectrum allocations, if desired. Conversely, dynamic allocation could be used to assign bandwidth in those frequencies that are of greatest value for the specific services desired by the various MNOs. Lower frequencies with higher coverage (but typically lower sub-carrier spacing) can be allocated to voice traffic, for example, while mid- and higher spectrum bands can be assigned to services that rely upon higher SCS and beamforming capabilities such as drones or robotics. Various embodiments therefore provide a wide range of network sharing systems that are dynamic, flexible and computationally (as well as economically) efficient.

According to various embodiments, a portion of the bandwidth serviced by one or more radio units (RUs) associated with a host provider can be dynamically allocated for use by a "guest" network operator using a provisioning plane or the like. The guest operator uses the provisioning plane to request available bandwidth on one or more RUs. If the requested bandwidth is available, the provisioning plane then dynamically communicates with the appropriate RUs to create a customized bandwidth allocation for the guest provider at the desired times, locations and/or radio frequencies. In some embodiments, the guest network operator can maintain its own network services through a virtualized set of CU and/or DU modules (as well as core and IMS modules), which are all synchronized to the same RUs operated by the host provider. The guest provider maintains control of its own secure network while reliably communicating via dynamically allocated portions of the host operator's RU spectrum. This allows the guest operator to create a highly configurable network using only the bandwidth and RU resources needed for the particular services.

In one example embodiment, an automated process is performed by a cloud-based or other data processing system associated with a host network to dynamically allocate a spectrum that is associated with a wireless radio unit (RU) of the host network amongst a plurality of guest networks each independently delivering one or more network services to user equipment (UE) associated with that guest network. The automated process suitably comprises: receiving, at a provisioning plane associated with the data processing system, input data that identifies a desired portion of the spectrum associated with the wireless radio unit for use by one of the guest networks; in response to the input data, the provisioning plane allocating the desired portion of the spectrum associated with the wireless radio unit for exclusive use by the one of the guest networks; and broadcasting, via the radio unit, data identifying a random access channel (RACH) opportunity to thereby permit the UEs in communication with the radio unit to responsively synchronize with the radio unit and to attach to the associated one of the guest networks to receive information about the allocated portion of the spectrum from the associated one of the guest networks, and to thereafter communicate with the associated guest network using the portion of the spectrum that is allocated for exclusive use by the guest network.

Another example provides a communications system associated with a host network. The wireless communication system suitably comprises a wireless radio unit (RU) configured to broadcast and receive transmissions over a spectrum and a provisioning plane executing on a data processing system that is in communication with the radio unit. In various embodiments, the provisioning plane is configured to perform an automated process to dynamically allocate a spectrum that is associated with the RU amongst a plurality of guest networks each independently delivering one or more network services to user equipment (UE) associated with that guest network.

Other embodiments may provide other systems, devices and automated processes relating to dynamic allocation of 5G wireless resources, as described in additional detail below.

DRAWING FIGURES

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

As noted above, a host operator is able to provide a "radio/spectrum as a service (R/SaaS)" system by dynamically allocating bandwidth on its own radio units for use by one or more guest network operators. This allocation can take place using a provisioning plane that allows guest network operators to select desired times of availability, geographic locations, amounts of bandwidth/available spectrum bands, and/or other parameters as desired. The provisioning plane communicates with the particular radio unit(s) within the 5G network system to apportion the available spectrum amongst the various guest operators as desired. In various embodiments, each guest operator maintains its own virtualized network functions (e.g., DUs, CUs, 5G Core, IMS, OSS/BSS/IT), thereby maintaining security and control of its own end-to-end network.

The spectrum management features described herein can be very powerful and flexible. Various embodiments are able to support relatively small bandwidth allocations (e.g., as small as 5 MHz or even less), as well as non-contiguous bandwidth allocations if desired. Conversely, spectrum fragmentation can be reduced (if not eliminated) through the dynamic allocation features described herein, since non-contiguous allocations can simply be restructured. Various embodiments additionally support multiple spectrum bands, carrier aggregation, dual connectivity and other features as appropriate.

Figure 1:
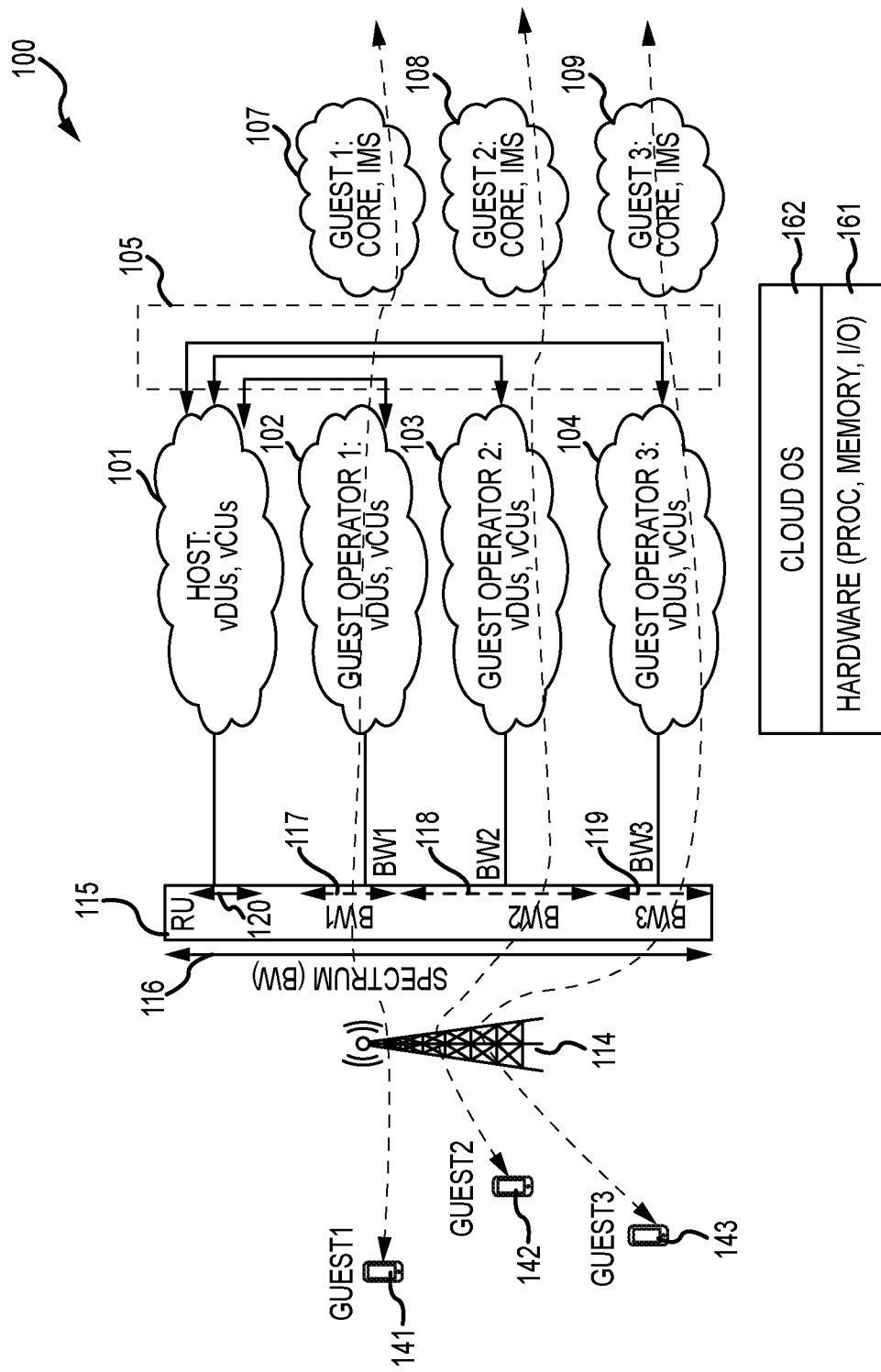
FIG. 1 shows an example of a system for implementing a wireless data network with shared access to spectrum assigned to one or more radio units.

With reference now to FIG. 1, in an example system 100 a host operator maintains ownership of one or more radio units (RUs) 115 associated with a wireless network cell. Each RU 115 suitably communicates with user equipment (UE) 141, 142, 143 operating within a geographic area using one or more antennas/towers 114 capable of transmitting and receiving messages within an assigned spectrum 116 of electromagnetic bandwidth. In various embodiments, guest networks 107, 108, 109 interact with a provisioning plane 105 to obtain desired spectrum (e.g., portions 117, 118, 119 respectively) across one or more of the RUs 115 operated by the host 101. Provisioning plane 105 allows guest network operators 107, 108, 109 to obtain or change their assigned bandwidths on different RUs 115 on an on-demand and dynamic basis. Other embodiments may process bandwidth allocation according to a predetermined schedule, or in any other temporal manner as desired.

The Open RAN standard breaks communications into three main domains: the radio unit (RU) that handles radio frequency (RF) and lower physical layer functions of the radio protocol stack, including beamforming; the distributed unit (DU) that handles higher physical access layer, media access (MAC) layer and radio link control (RLC) functions; and the centralized unit (CU) that performs higher level functions, including quality of service (QoS) routing and the like. The CU also supports packet data convergence protocol (PDCP), service data adaptation protocol (SDAP) and radio resource controller (RRC) functions. The RU, DU and CU functions are described in more detail in the Open RAN standards, as updated from time to time, and may be modified as desired to implement the various functions and features described herein. In the example of FIG. 1, host 101 maintains one or more DUs and CUs as part of its own network. The DU suitably communicates with one or more RUs 115, as specified in the Open RAN standard.

The various network components shown in FIG. 1 are typically implemented using software or firmware instructions that are stored in a non-transitory data storage (e.g., a disk drive or solid state memory) for execution by one or more processors. In particular, the various components shown in FIG. 1 can be implemented using cloud-based hardware 161 and an appropriate operating system 162 such as the Amazon Web Service platform provided by Amazon Inc., although other embodiments could use other cloud platforms and/or any type of conventional physical computing hardware 161, as desired.

As illustrated in FIG. 1, system 100 suitably includes a host network 101 and one or more guest networks 102, 103, 104. The host network 101 is typically operated by an organization that owns radio equipment and sufficient spectrum (potentially on different bands) to offer 5G capacity and coverage. Host network 101 may or may not be a 5G MNO that provides 5G service to its own UEs. Host network 101 will include at least one DU and at least one CU, both of which will typically be implemented virtually using cloud resources. If host network 101 does provide 5G MNO services, then it will also possess appropriate 5GC, IMS, and IT/OSS/BSS services as appropriate.

One or more guest networks 102, 103, 104 operated by guest operators 107, 108, 109 (respectively) can manage their own networks using allocated portions of the bandwidth 117, 118, 119 handled by one or more of the RUs 115 associated with the host 101. The guest networks 102, 103, 104 are allowed to communicate with one or more UEs 141-143 using allocated bandwidth 117, 118, 119 on the host's RU 115. Guest networks 102, 103, 104 may include one or more virtual DUs and CUs, as well as unique core functions and IP multimedia subsystems (IMS), as desired. Generally, one or more guest operators will instantiate its own 5G virtualized network functions (e.g., IMS, vCUs, vDUs, and IT/OSS/BSS) using cloud-based resources, as noted above.

Guest operators lease or otherwise obtain any needed 5G access for its planned services, capacity and coverage based on an arrangement with the host provider. A guest provider then operates and manages its own 5G network 107, 108, 109 independently of the host 101 and the other guests. As noted herein, an orchestrator aligns all the players including the host and all the guests. A network operator can optimize its own network for unique target services by intelligently selecting its spectrum, RUs, vDU/MAC scheduler, vCU and 5G Core and IMS NFs, as described more fully herein.

The provisioning plane 105 cooperates with the RUs 115 in various cells to supply the requested bandwidth at the requested times. Generally speaking, guest operators 107, 108, 109 communicate with the host network 101 via provisioning plane 105, which executes on real or virtual hardware 161 within system 100. The provisioning plane 105 typically retains public land mobile network (PLMN) information identifying primary (PCell) and secondary (SCell) cells associated with the various RUs 115, as well as the times and bandwidths assigned on each cell. In various embodiments, the provisioning plane 105 identifies the allocated spectrum on each RU 115 according to physical resource blocks (PRBs) that can be stored for later processing and retrieval. Portion 118, for example, is described by one or more PRBs of spectrum 116, and portion 119 is described by a different set of PRBs. As noted above, bandwidth to any guest operator may be non-contiguous, if desired. Each guest network will typically maintain a copy of its own PLMN, bandwidth and timing information, but there is generally no need for guests to share information about each other.

Each RU 115 is typically associated with a different wireless cell that provides wireless data communications to user devices 141-143. RUs 115 may be implemented with radios, filters, amplifiers and other telecommunications hardware to transmit digital data streams via one or more antennas 114. Generally, RU hardware includes one or more processors, non-transitory data storage (e.g., a hard drive or solid state memory) and appropriate interfaces to perform the various functions described herein. RUs are physically located on-site with the transmitter/antenna 114, as appropriate. Conventional 5G networks may make use of any number of wireless cells spread across any geographic area, each with its own on-site RU 115.

RUs 115 support wireless communications with any number of user devices 141-143. User devices 141-143 are often mobile phones or other portable devices that can move between different cells associated with the different RUs 115, although 5G networks are also widely expected to support home and office computing, industrial computing, robotics, Internet-of-Things (IoT) and many other devices. While the example illustrated in FIG. 1 shows one RU 115 for convenience, a practical implementation will typically have any number of RUs 115 that can each be individually configured to provide highly configurable geographic coverage for a guest network, if desired.

Figure 2:
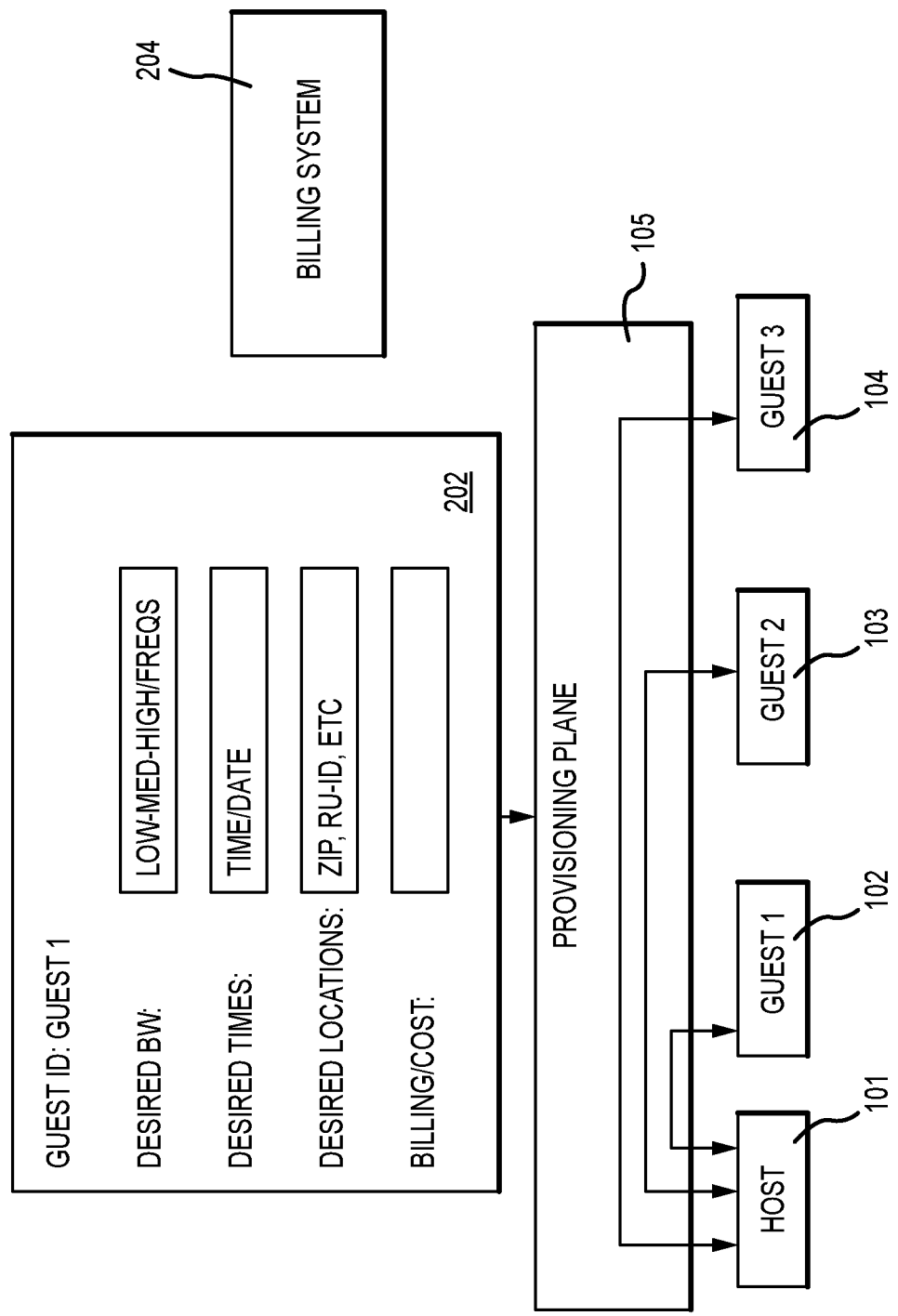
FIG. 2 shows an example of a provisioning plane that dynamically allocates spectrum assigned to one or more radio units to various guest networks.

Referring now to FIG. 2, an example of a provisioning plane 105 is implemented using cloud computing resources to facilitate sharing of spectrum associated with one or more RUs 115. Configuration plane 115 is implemented within an application program interface (API), web interface or the like that allows guest operators to supply appropriate parameters to obtain desired network access. In the example of FIG. 2, a graphical interface 202 suitably includes input features for the guest operator to supply desired times, locations and/or bandwidth requests. Bandwidth requests may be specified in terms of frequencies, if desired, or by services (e.g., voice, robotics, drones, data, etc.) as appropriate. As noted above, some guest operators may wish to obtain specific low, medium and/or high frequencies based upon the specific services that they intend to provide. Network operators can also specify dates and/or times that the spectrum is requested, as well as particular locations. Various embodiments could specify locations according to RU identifiers, if available, although other embodiments could allow allocation of resources according to ZIP code, city/county, state or other geographic parameters. Cost information associated with the requested spectrum may also be presented, if desired. The example interface 202 is intended to present the types of information that could be presented; a practical implementation may appear very different from the illustration of FIG. 2, and/or may present the information shown in any number of different screens.

Provisioning plane 105 suitably supports communications between the host network 101 and guest networks 102, 103, 104 to request for any adjustments in allocated 5G access. In this communication, the guest 102, 103, 104 typically provides a set of its network identifiers (e.g., identifiers for a home public land mobile network (HPLMN) and any roaming public land mobile networks (PLMNs)) to the host 101. This permits the host 101 to broadcast all of the PLMN IDs of all of the guests 102, 103, 104 in the system information block (SIB) as discussed below. The host 101 also informs each guest 102, 103, 104 of its leased spectrum resources, i.e., the physical resource block (PRB) set allocated to the guest in each leased band.

FIG. 2 also illustrates a billing system 204 that may be implemented using cloud resources or the like. In various embodiments, guest network operators are billed for their allocated spectrum according to a lease agreement or the like. By allowing guest operators to request only the spectrum that is needed in desired locations and at desired times, considerable cost savings can be realized compared to leasing entire frequency bands at all possible times and locations as in most current leasing arrangements.

Additionally, allocated spectrum can be scaled up or down and/or additional times and locations can be allocated as desired, often with little or no lag time. In various embodiments, spectrum 115 can be allocated or de-allocated in real time, or very near real time (accounting for some delay that is inherent in data processing and data communications). Billing system 204 suitably charges each guest network only for the services actually allocated and used, thereby allowing for substantial cost efficiencies without sacrificing the ability to quickly ramp up additional services.

In operation, then, the provisioning plane 105 suitably configures shared spectrum 116 on one or more particular RUs 115. Generally, a guest network operator will establish a connection with provisioning plane 105 via an API or web interface. The operator will typically be authenticated with suitable digital credentials (e.g., userid/password, digital signatures, biometrics and/or the like). When authenticated, the guest operator is able to supply appropriate parameters (e.g., time, location, frequency bands) for requested network access. The provisioning plane 105 appropriately determines if the requested access is available, and if so, the appropriate RU(s) 115 are notified through the host network 101. Provisioning plane 105 also interacts with a billing system 204 as appropriate.

In various embodiments, each guest network communicates the allocated portions 117, 118, 119 of spectrum 116 to its associated UEs 141, 142, 143 through 3GPP bandwidth portions (BWPs) or the like. BWPs allow the guest network to confine the bandwidth used by a particular UE 141, 142, 143 to a particular frequency range. In the 3GPP standard, each UE 141, 142, 143 can be assigned up to four BWPs for upload or download, and BWPs can overlap if desired.

Figure 3:
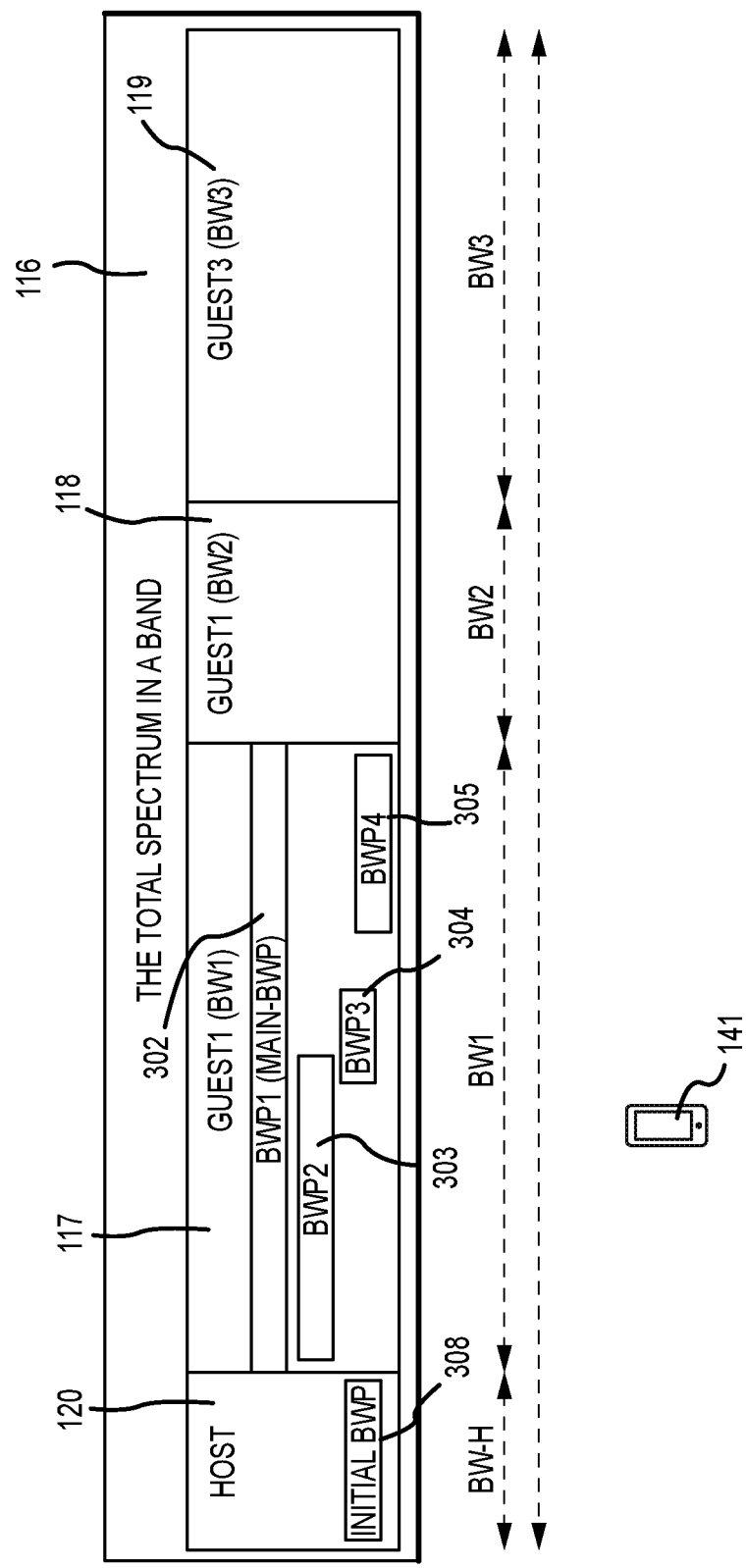
FIG. 3 shows an example allocation of bandwidth in a spectrum assigned to a radio unit.

In the example illustrated in FIG. 3, each portion 117, 118, 119 allocated to guest networks 102, 103, 104 (respectively) is described by a range of BWPs that are assigned by the guest networks 102, 103, 104. Guest1 manages its own portion 117, for example, with a "main BWP" 302 that describes the entire allocated frequency band 117, with more limited bands 303, 304, 305 for specific upload or download functions. Each of these BWPs 302-305 are communicated to UEs 141 associated with that guest network, noting that each UE 141 may receive its own BWP set. Each UE 141 may have a unique set of assigned BWPs 302-305 within the assigned portion 117 of spectrum 116, as appropriate. Other embodiments may assign the same or similar BWPs 302-305 to multiple UEs 141, if desired. The guest network may assign BWPs 303, 304, 305 (as well as any other BWPs within the allocated band 117) as desired to any number of UEs 141 for appropriate uplink and downlink communications as desired.

BWPs may be communicated to the UEs 141 associated with each guest network in any manner. In various embodiments, the provisioning plane 105 communicates the assigned frequency bands 117, 118, 119 to guest networks 102, 103, 104. The guest networks, in turn, each assign BWPs to particular UEs 141 and communicate the assigned BWPs to each UE 141 as desired. In various embodiments, a CU associated with the guest (discussed below) communicates BWP information using RRC signaling or the like. Other embodiments could use other protocols for delivering frequency band assignments to associated UEs 141, as desired. BWP switching could be managed using downlink control information (DCI) from a guest DU, for example. Other embodiments using other protocols and signaling techniques could be equivalently used.

FIG. 3 also shows an initial BWP 308 within spectrum allocated to host network 101 (although other implementations may assign the initial BWP 308 in any other portion of spectrum 116). In various embodiments, this initial BWP 308 is assigned to facilitate initial attachment with the UE 141, 142, 143 as described more fully below. This shared initial BWP 308 supports timing synchronization between the various networks 101, 102, 103, 104 so that guard bands may not be necessary. That is, devices 141, 142, 143 associated with host network 101 or any guest network 102, 103, 104 will synchronize to the RU 115 in both time and frequency, and on both uplink and downlink traffic, as described more fully below. This will cause the waveforms of the various signals sent and received by UEs 141, 142, 143 to be orthogonal, thereby eliminating interference with each other. Time synchronization between RU 115 and the various DUs and CUs operating in networks 101, 102, 103, 104 may also be needed in some embodiments.

Although UL and DL traffic is synchronized to the host 101, each guest network autonomously manages and schedules its own physical resource blocks (PRB) over its allocated spectrum. The host RU 115 will generally monitor spectrum transmissions to ensure compliance with the assigned schedule. But each guest operator designs its own scheduler (e.g., in its own virtual DU) for processing its own network services.

Figure 4:
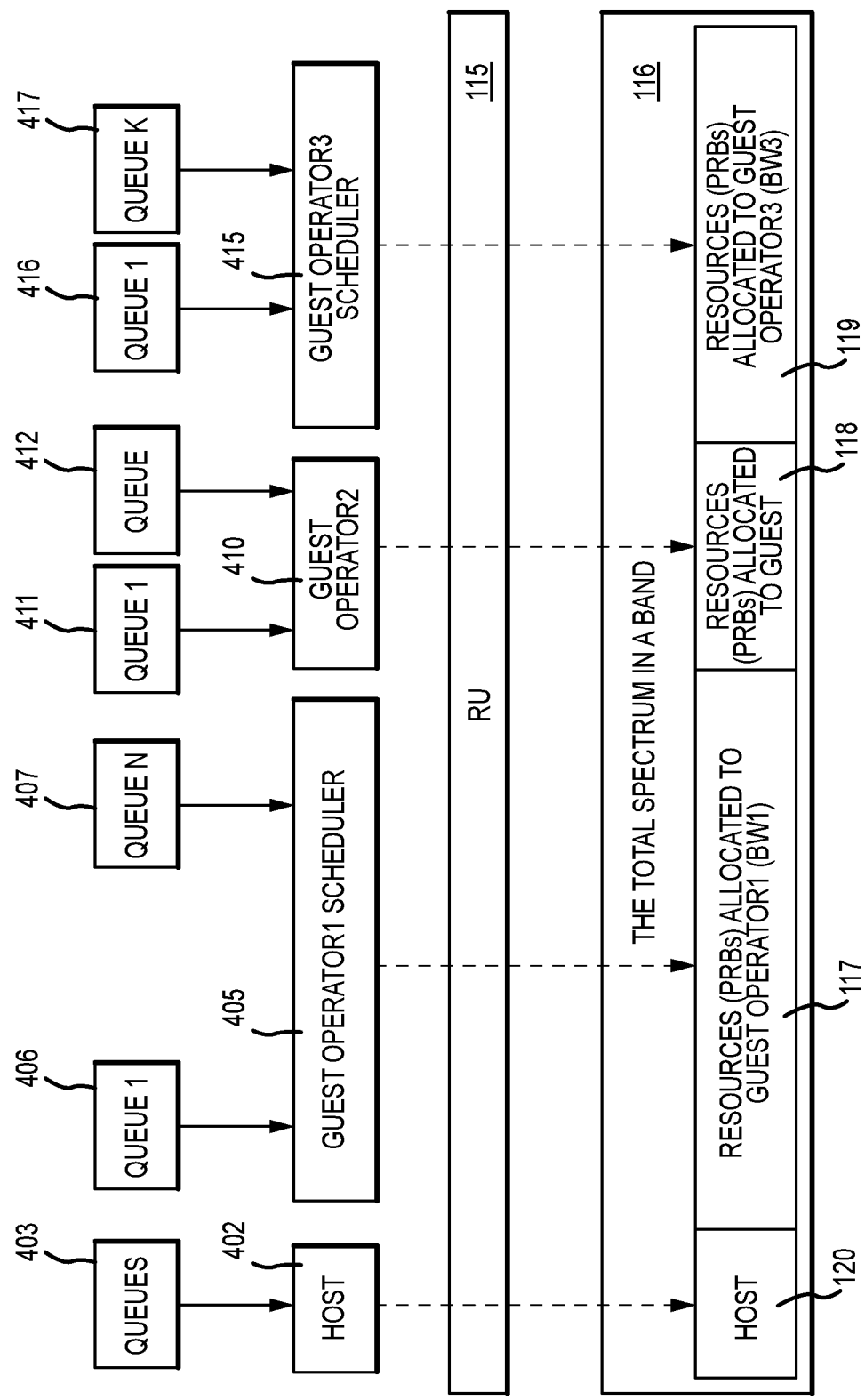
FIG. 4 illustrates an example of packet scheduling in a shared spectrum environment.

FIG. 4 illustrates an example of a system 400 in which spectrum 116 is assigned into different portions 120, 117, 118, 119 as described above. The host 101 maintains its own scheduler 402 for processing items in host queue 403. Similarly, guest operators 102, 103 and 104 maintain their own schedulers 405, 410 and 415 to process items in their own queues 406-407, 411-412 and 416-417, respectively.

Typically, schedulers 402, 405, 410 and 415 are implemented within cloud computing resources associated with a virtual DU. In the example of FIG. 4, each guest network would maintain its own separate DU to schedule communications within its own assigned bandwidth parts. In other embodiments, host network 101 could also provide a shared DU to some or all of the different guests sharing the spectrum 116. In a shared DU implementation, each guest could maintain its own virtual CU, 5G core and IMS functions using cloud computing resources. Still other embodiments could allow host 101 to provide both shared DU and CU features that support the guest's 5G core and IMS functions, as desired. The various shared functions could be mixed and matched as desired, with some guests using shared resources as may be available and other guests using their own resources, as appropriate. That is, some guest operators may make use of shared DU and/or CU resources from host network 101 while other guest operators provide their own virtual DU and/or CU functions, as desired.

Figure 5:
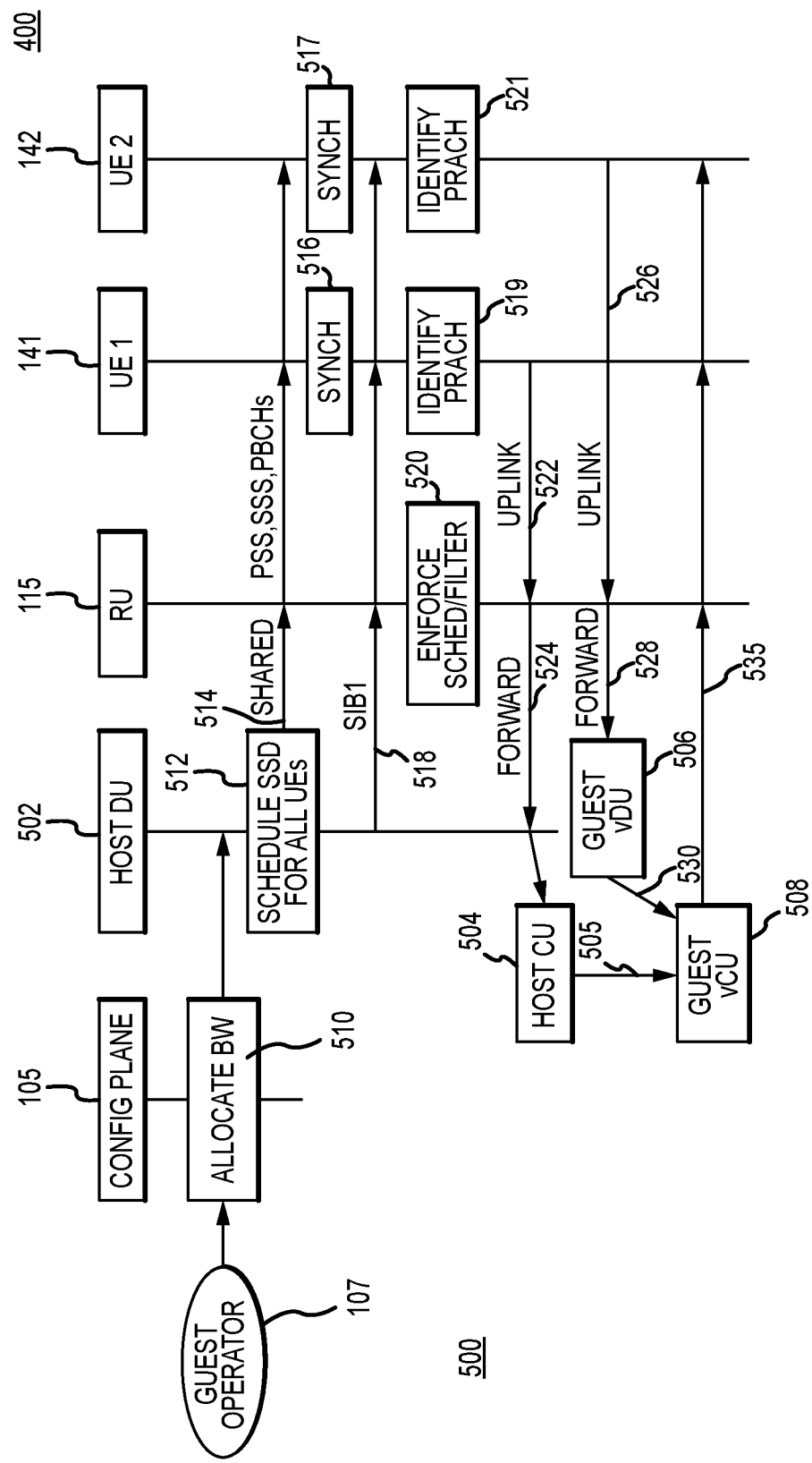
FIG. 5 shows an example of an automated process to establish communications with user equipment in a shared spectrum environment.
Figure 6:
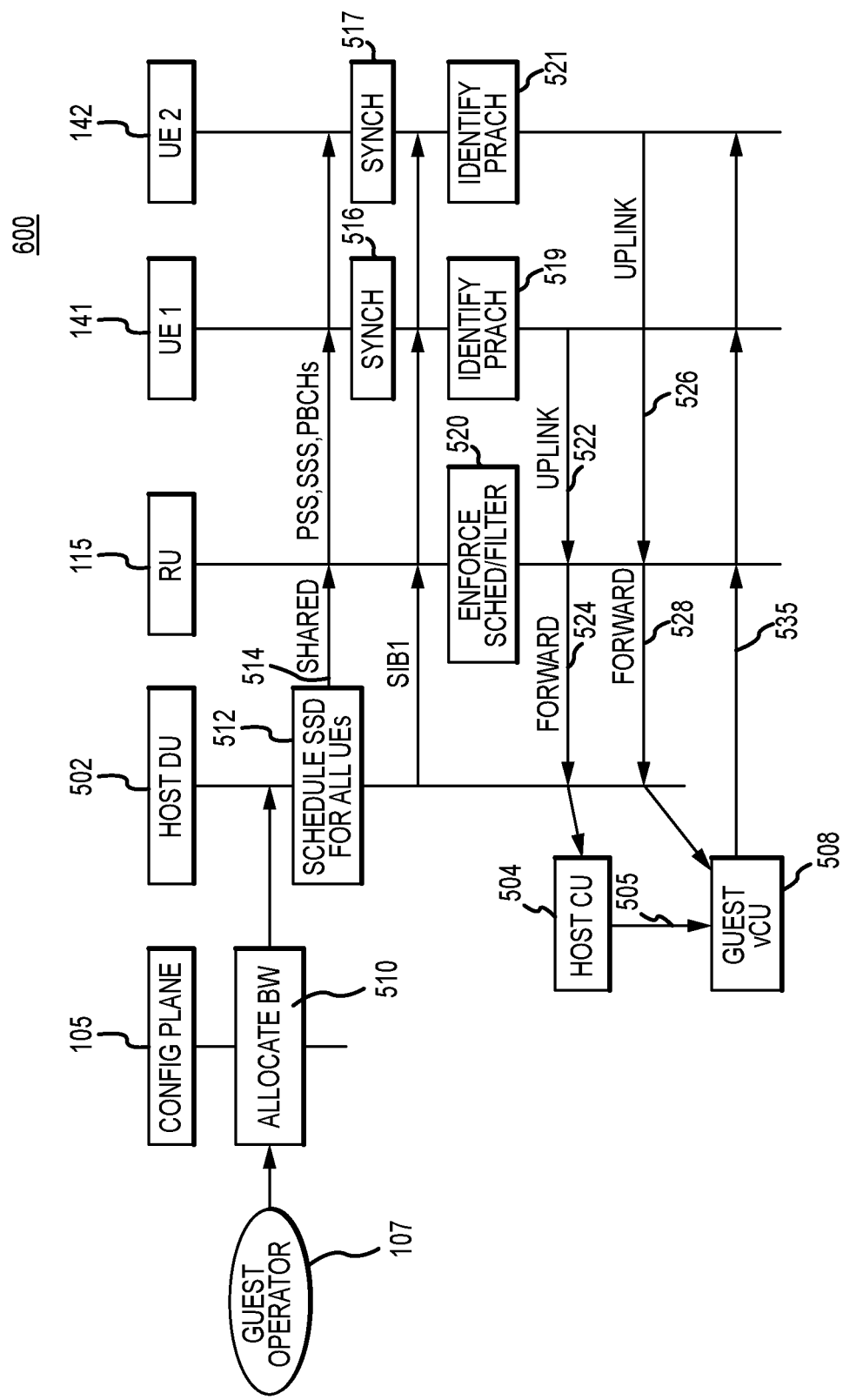
FIG. 6 shows an example of an alternate automated process to establish communications with user equipment in a shared spectrum environment.

FIGS. 5 and 6 show several examples of automated processes 500, 600 to handle communication using the shared spectrum 116 while maintaining separate networks for host 101 and guests 107, 108. In the example of FIG. 5, a process 500 allows a guest network 102 to maintain control of random uplink channels by providing its own virtual DU(s) 506 as desired. In the example of FIG. 6, a similar process 600 allows for host control of the random uplink channel (PRACH) using a shared DU 502, as appropriate. Both implementations use shared downlink synchronization to transmit the appropriate scheduling information to devices operating in communication with RU 115. Commonly labeled elements of FIGS. 5 and 6 therefore refer to very similar, if not identical features and functions. Additionally, although this example uses a single guest operator 107 for clarity, practical embodiments will simultaneously provide equivalent functions and features for any number of additional guest operators 108, 109.

With reference now to FIG. 5, a guest network operator uses the configuration plane 105 described above to request bandwidth allocations at desired times and places. Various embodiments may also allow the guest to request contiguous bandwidth (potentially for an additional fee), or to select other parameters as desired. In various embodiments, configuration plane 105 interacts with a billing system 204 or the like so that the host provider can be paid for leased portions of the network. As noted above, provisioning plane 105 may provide a suitable user interface 202 that allows an operator to enter desired parameters. The allocated bandwidth portions on each RU 115 are communicated within host network 101 to the host DU 502 that is associated with the RU 115.

Spectrum 116 associated with each RU 115 can be allocated in any manner (function 510). In various embodiments, the provisioning plane 105 suitably allocates bandwidth for each leased portion 117, 118, 119 and communicates this information to the relevant RU 115, and to each guest network 107, 108, 109. RU 115 enforces the assigned schedule, but each guest network 107, 108, 109 is responsible for communicating its assigned bandwidth to its own UEs 141, 142. This isolates information between the different guest networks 107, 108, 109 while still allowing for synchronization of all the UEs 141, 142 operating within range of RU 115.

Host network 101 maintains responsibility for uplink (UL) and downlink (DL) system synchronization. To that end, adjoining frequency bands 117, 118, 119 can be time and frequency synchronized to the host network 101, thereby reducing (or even eliminating) the need for bandwidth separation between PRBs. To maintain synchronization, the DU 502 associated with the host network 101 formats synchronization signal blocks (SSB) (function 204) that are broadcast on the downlink of the RU 115 to all user devices 141, 142 without regard to the network 101, 102, 103 used by that device. Each of the UEs 141, 142 operating on a cell will share the same downlink synchronization data. The SSB 514 typically includes conventional 5G information such as primary synchronization schedule (PSS), secondary synchronization schedule (SSS), physical broadcast channel (PBCH) data and/or the like. The SSB 514 is broadcast by RU 115 so that all devices 141, 142 are able to receive and process the same time and frequency synchronization information (functions 516, 517).

Each user device 141, 142 synchronizes to the downlink using the received SSB broadcast 514 (functions 516, 517). As noted above, the SSB 514 is typically broadcast periodically at predictable time intervals, and contains sufficient PSS, SSS and other data to allow each UE 141, 142 to time and frequency synchronize to the host downlink. SSB periods may be configurable, but are often chosen to be between about 5 and about 160 msec, with a default value of about 20 msec, although other embodiments could use different intervals as desired. The SSB 514 will typically include master block information (MIB) within the PBCH, which provides enough information for each UE 141, 142 to obtain the system information block (SIB), often in SIB-1 format.

Host DU 502 therefore formats system information 518 that can be simultaneously broadcast to each of the devices 141, 142 in accordance with the timing information contained in the SSB 514. Conventional 5G major information blocks (MIB s), system information blocks (SIBs) and on-demand system information (OSI) can be scheduled and broadcast by DU 115. Generally, the MIB data is transmitted in the physical broadcast channel described by the SSB 514 discussed above. Generally, SIBs 518 are generated periodically, and can be scheduled through the MIB contained within SSB 514. In some equivalent implementations, the SIBs 518 are provided in response to an on-demand other signal information (OSI) message sent by the UE 141, 142, as appropriate.

In various embodiments, the SIB 518 broadcast includes the PLMNs associated with each guest network 102, 103 operating within the cell, thereby allowing UEs 141, 142 to recognize their associated PLMN and to initiate contact with RU 115 as described herein. Other system information (OSI) can be scheduled and broadcast within the allocated portion assigned to a guest operator, if desired. Alternately, OSI information may be scheduled by the host 101 for subsequent broadcast through cooperation with the guest operators as desired.

Each user device 141, 142 uses information contained within the SIB 518 to make initial contact with that device's PLMN (functions 519, 521). After attachment with the UE 141, 142, each guest network 102, 103 will schedule its own uplink and downlink traffic on its assigned PRBs, as described herein. The host RU 115 suitably monitors the schedule of assigned PRBs, however, to ensure that guest devices operate only over the allocated PRBs (function 212) and to prevent spillover or other mis-use of unallocated spectrum. RUs 115 may enforce the schedule by discarding or ignoring non-compliant traffic, by responding to non-compliant traffic with an error message, and/or by taking other actions as desired.

To initially attach to the appropriate network, user devices 141, 142 use a synchronized physical random access uplink channel (PRACH) as appropriate. Initial uplink communications from user devices 141, 142 can take place in any number of different ways. In various embodiments, the 5G random upload channel (PRACH) can be managed in any number of different ways to provide efficient throughput of uploaded data. In the example of FIG. 5, different PRACHs are terminated using different DUs 502, 506. In the example of FIG. 6, a shared PRACH is terminated using the host DU 502. Additional PRACHs may be terminated using the host DU 502, if desired.

As noted above, each device 111, 112 receives synchronization signals (SSB) 514, SIB 518 and physical random access channel (PRACH) opportunity data that are configured, scheduled and broadcast by the host DU 502. All of the devices 141, 142 therefore synchronize to the host network 101 on the download link, and to obtain uplink information. To attach to the appropriate network, the device 141, 142 suitably transmits a message on the appropriate uplink identified in the SIB 518. The host DU 502 typically receives the preamble sequence from the UE, measures any timing error, and sends a timing advance (TA) command back to the UE 141, 142. This TA command will allow the device to synchronize on subsequent UL communications, as needed.

In some implementations (e.g., 3GPP Releases 15 and 16), DU 502 will forward any attachment messages to the host CU 504 so that the UE 141, 142 can be matched to its appropriate network. Typically, the host CU 504 will compare any PLMN identifiers in the uplink message against a table of recognized PLMNs. If the PLMN of the device 141, 142 is recognized, then the message is forwarded 505 to the relevant guest CU 508 for further processing, if the guest provides its own CU 508 (as in FIG. 5). If the guest does not provide its own CU 508, then the host CU 508 may forward the message to the appropriate guest network resources for further processing. If the received uplink messages is a radio resource control (RRC) message, for example, that message can be forwarded to a central unit control plane associated with the appropriate network 101, 102, 103 for termination. Similarly, non-access stratum (NAS) or similar messages can be transmitted for termination at the appropriate core network 101, 102, 103. The guest network then takes over to complete the attachment process, including authentication, service authorization, slice selection, packet data unit (PDU) session creation, etc.

After the device 141, 142 is recognized, subsequent communications may be processed more efficiently. In the example of FIG. 5, the guest network maintains its own DU 506. The RU 115 may be notified (e.g., from host DU 502) that subsequent communications from the recognized device should be forwarded directly to guest DU 506, as shown by message 528. Guest DU 506 will then forward traffic 530 through its own CU 508, as desired. In other embodiments, the guest network may use host DU 502 resources instead of its own. After initial attachment, host CU 504 will typically notify the host DU 502 that subsequent communications 602 associated with the now-recognized device 141, 142 should be forwarded to the guest CU 508, as shown in FIG. 6. Many other embodiments could process attachment and subsequent communications in any other manner, as desired.

As 3GPP and other standards become more mature, it may be possible to make use of future features in the initial attach process. 3GPP Release 17, for example, may include radio access network (RAN) slicing features that could be used to recognize an attaching device 141, 142 based upon its PLMN-ID and to quickly direct traffic from that device towards an appropriate guest network 107, 108, 109 as desired. A "slice-based" RACH configuration feature in 3GPP Release 17, for example, could allow mapping of slice-IDs to PRACH occasions. By mapping slice identifiers to specific guest networks 107, 108, 109, each UE 141, 142 would be able to message its own network indirectly (through the RU 115) but immediately using the appropriate RACH occasion for its assigned network. A slice identifier could further include a slice service type (SST) and a slice differentiator (SD). If the SD value were mapped to disjoint ranges and each range was assigned to a different guest network, then the system could use this information to quickly differentiate devices belonging to different networks based upon the SD of the received slice identifier. This arrangement would also allow each guest network to support multiple slices of the same service type. Still other embodiments could use future standardization efforts in 3GPP or the like to support PLMN based PRACH occasions, if and when such features become available.

After attachment, each guest network 107, 108, 109 communicates with its associated UEs 141, 142 using that network's allocated portions of spectrum 116. In various embodiments, a CU 508 associated with the appropriate network will assign bandwidth parts (BWPs) to each associated UE 141, 142 (shown with message 535 in FIGS. 5 and 6). BWPs for each UE 141, 142 can be communicated to that UE 141, 142 via RRC signaling or the like. As noted above (e.g., in the discussion of FIG. 3), each UE 141, 142 can be assigned up to four different BWPs for each of uplink and downlink, and BWPs can overlap if desired. The appropriate CU 508 will communicate the assigned BWPs to each UE 141, 142, which will then use the assigned frequency bands for subsequent communication. Other embodiments could use other protocols for delivering frequency band assignments to associated UEs 141, 142, as desired. BWP switching could be managed using downlink control information (DCI) from the guest DU 506, for example, in an equivalent embodiment.

One benefit of dynamic spectrum allocation is that networks can be readily re-configured without disrupting operations. Modifications can happen as one or more guests scale their bandwidth allocations upward or downward, or for any other reason. As mentioned previously, spectrum can be readily reconfigured to avoid spectrum fragments, if desired. Although fragments may be desirable in some circumstances (e.g., a guest requests bandwidth for both low-frequency and high-frequency services), generally the network will operate more efficiently if bandwidth fragments are reduced.

Figure 7:
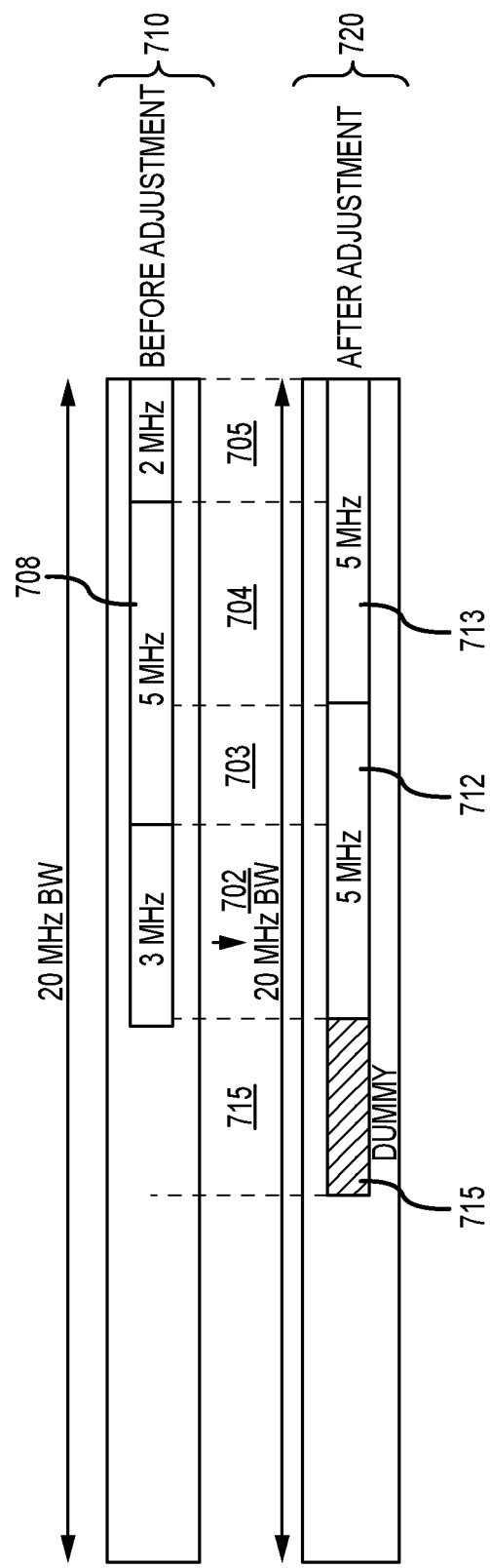
FIG. 7 illustrates an example process to reassign a bandwidth portion in a shared spectrum environment.

FIG. 7 shows one example of a spectrum allocation 710 between two guest networks that can be de-fragmented into a new allocation 720. In the initial allocation 710, one guest network is initially associated with two separate fragments 702 and 705, and another guest network is initially associated with a contiguous fragment 708. If it is desired to de-fragment the spectrum allocation, then each network will generally temporarily re-assign UEs using BWPs in the transitioning fragments to use other portions of the spectrum.

In the example of FIG. 7, it is necessary to change the frequency ranges of both guests operating in the spectrum since the frequencies in desired allocation 720 of both guest networks overlap with the frequencies currently assigned in allocation 710. To support this, a "dummy" frequency range 715 can be used to temporarily transition certain UEs associated with one of the guests until contiguous bandwidth can be freed up. Although FIG. 7 shows the dummy portion 715 in the lower frequency range of the spectrum, alternate embodiments could equivalently use higher frequencies, or any other frequency bands that may be available to support the types of traffic being conducted by UEs 141, 142 while using the dummy portion 715.

Each guest network initially re-assigns those UEs operating within the transitioning frequency bands to another range. One way to accomplish the example of FIG. 7 would be for the second guest network to initially transition any use of band 703 to the dummy band 715. This would occur by the guest network sending update messages to the relevant UEs 141, 142 and providing some time (e.g., a few seconds) for the devices to transition into the new frequency band 715. After all of the UEs 141, 142 previously operating within band 703 have been moved to band 715, then band 703 may be dis-associated with the second guest network and re-assigned to the first guest network. The first guest network would then transition any devices using band 705 into the now-available band 703. The first guest network would therefor operate on bands 702 and 703, thereby forming a contiguous band 712. Specific operations within band 712 could then be managed by the first guest network, as desired.

After the first guest network has ceased operations within band 705, the band can be re-assigned for use by the second guest network. Typically, the second guest network will move devices operating in the dummy band 715 into the new range 705, but reassignment could allow devices associated with the second guest network to operate anywhere within the new contiguous frequency range 713 that is now associated with the second guest network.

The various re-assignments described herein may be managed by the configuration plane 105 which appropriately communicates with the host and guest networks 101, 102, 103, 104 to process the re-assignments using new BWP assignments or the like. To that end, configuration plane 105 is able to re-configure the bandwidth allocations 116, 117, 118, 119 associated with the various host and guest networks as desired. Such re-configuration may take place in real time in response to guest network operator requests, host operator requests, changing network or environmental conditions, and/or any other factors as desired.

The general concept of dynamic bandwidth allocation is especially powerful when combined with the scalability of backend services provided by cloud computing. Guest network operators can rapidly and dynamically obtain and release cloud computing resources from the cloud computing host on an as-needed basis, thereby preventing purchase of excessive capabilities while retaining the ability to handle expected or unexpected peak loads. Guest network operators may instantiate additional virtual modules, for example, to address additional demand as needed. Similarly, various embodiments may allow fast acquisition of additional computing resources (e.g., more processing capability or data storage) for existing virtual modules, if desired. Because the guest network operator is no longer constrained by the need to obtain spectrum and physical infrastructure, customized 5G networks can very rapidly be deployed on any scale, having any desired capability, and for any desired time periods.

As noted above, computing components shown in the figures may be implemented using cloud-type hardware that abstracts the processor, non-transitory data storage and conventional input/output interfaces that are found in traditional computing hardware. RUs 115 will generally include radio unit (RU) specific hardware, including processors, non-transitory data storage and conventional input/output interfaces that are typically used within the wireless industry. Generally speaking, the various components shown in FIGS. 5-6 will format messages and perform the various functions shown in the diagram under the control of computer-executable instructions (e.g., software or firmware code) that are stored in the non-transitory storage for execution by one or more processors. Equivalent embodiments could use any types of computing hardware, including any combination of conventional and cloud-based hardware.

What is claimed is:

1. An automated process performed by a data processing system associated with a host network to dynamically allocate a spectrum that is associated with a wireless radio unit (RU) of the host network amongst a plurality of guest networks each independently delivering one or more network services to user equipment (UE) associated with that guest network, the automated process comprising:
   receiving, at a provisioning plane associated with the data processing system, input data that identifies a desired portion of the spectrum associated with the wireless radio unit for use by one of the guest networks;
   in response to the input data, the provisioning plane allocating the desired portion of the spectrum associated with the wireless radio unit for exclusive use by the one of the guest networks; and
   broadcasting, via the radio unit, data permitting the UEs in communication with the radio unit to responsively synchronize with the radio unit and to attach to the associated one of the guest networks and thereby receive information about the allocated portion of the spectrum, and to thereafter communicate with the associated guest network using the portion of the spectrum that is allocated for exclusive use by the guest network.

2. The automated process of claim 1 wherein the allocating occurs substantially in real time in response to receiving the input data.

3. The automated process of claim 1 wherein the input data describes limited times that the portion of the spectrum is desired, and wherein provisioning plane assigns the desired portion of the assigned spectrum for use by the guest network during the limited times, and wherein the provisioning plane releases the desired portion for other use outside of the limited times.

4. The automated process of claim 1 further comprising re-configuring, by the host network system, the portion of the spectrum allocated for exclusive use by the guest network without disrupting operation of the guest network.

5. The automated process of claim 4 wherein the re-configuring comprises:
  re-directing UEs operating in an initially-allocated portion of the spectrum to a temporary frequency band;
  de-allocating at least a portion of the initially-assigned spectrum associated with the wireless radio unit for exclusive use by the one of the guest networks;
  allocating a new portion of the spectrum for exclusive use by the one of the guest networks; and
  re-directing UEs operating in the temporary frequency band to the new portion of the spectrum.

6. The automated process of claim 4 wherein the re-configuring comprises de-fragmenting portions of the spectrum that are assigned to different guest networks into new contiguous portions.

7. The automated process of claim 1 further comprising formulating, by a distributed unit (DU) of the host network, a synchronization signal block (SSB) message, and wherein the broadcasting comprises transmitting the SSB to each of the radio units.

8. The automated process of claim 7 wherein the SSB comprises synchronization information that permits the UEs to receive a system information block (SIB) subsequently broadcast by the RU.

9. The automated process of claim 7 wherein each of the UEs is time and frequency synchronized to the host network using information in the SSB.

10. The automated process of claim 9 wherein the allocating comprises assigning the portions of the spectrum for exclusive use by each of the guest networks without assigning guard bands between allocated portions.

11. The automated process of claim 1 wherein a distributed unit (DU) in communication with the radio unit recognizes the UE associated with one of the guest networks based upon a primary land mobile network (PLMN) identifier in an uplink message received via a RACH opportunity broadcast by the RU.

12. The automated process of claim 11 wherein the DU forwards the uplink message to a centralized unit (CU) that is associated with the guest network that assigns bandwidth parts (BWPs) within the assigned portion of the spectrum to the UE for subsequent communications.

13. A wireless communication system associated with a host network, the wireless communication system comprising:
  a wireless radio unit (RU) configured to broadcast and receive transmissions over a spectrum; and
  a provisioning plane executing on a data processing system that is in communication with the radio unit, wherein the provisioning plane is configured to perform an automated process to dynamically allocate a spectrum that is associated with the RU amongst a plurality of guest networks each independently delivering one or more network services to user equipment (UE) associated with that guest network, the automated process comprising:
    receiving, at a provisioning plane associated with the data processing system, input data that identifies a desired portion of the spectrum associated with the wireless radio unit for use by one of the guest networks; and
    in response to the input data, the provisioning plane allocating the desired portion of the spectrum associated with the wireless radio unit for exclusive use by the one of the guest networks;
  wherein the wireless communication system is further configured to broadcast, via the radio unit, data permitting the UEs in communication with the radio unit to responsively synchronize with the radio unit and to attach to the associated one of the guest networks and thereby receive information about the allocated portion and to thereafter communicate with the associated guest network using the portion of the spectrum that is allocated for exclusive use by the guest network.

14. The wireless communication system of claim 13 further comprising a distributed unit (DU) in communication with the radio unit, wherein the DU is configured to recognize the UE associated with one of the guest networks based upon a primary land mobile network (PLMN) identifier in an uplink message received via a RACH opportunity broadcast by the RU and to forward the uplink message to a centralized unit (CU) that is associated with the guest network.

15. The wireless communication system of claim 14 wherein the CU associated with the guest network assigns bandwidth parts (BWPs) within the assigned portion of the spectrum to the UE for subsequent communications, and wherein the BWPs are communicated to the UE via a radio resource control (RRC) message from the CU associated with the guest network.

16. The wireless communication system of claim 13 wherein the allocating comprises configuring, by the data processing system, physical resource blocks (PRBs) of the spectrum that correspond to the allocated portion of the assigned spectrum, and wherein each guest network assigns bandwidth parts (BWPs) within its assigned PRBs to UEs associated with that guest network.

17. An automated process to be performed by a user equipment (UE) associated with one of a plurality of guest networks each delivering one or more network services via an assigned portion of a spectrum that is dynamically assigned by a shared host network for exclusive use by each guest network, the automated process comprising:
  receiving synchronization data broadcast by a radio unit (RU) of the shared host network;
  synchronizing with the RU of the shared host network based upon the synchronization data to thereby obtain information about the portion of the spectrum assigned to the one of the plurality of guest networks that is associated with the UE; and
  subsequently communicating with the associated guest network using the portion of the spectrum dynamically assigned for exclusive use by the guest network associated with the UE.

18. The automated process of claim 17 wherein the synchronization data comprises a random access channel (RACH) opportunity broadcast by the RU.

19. The automated process of claim 18 wherein a distributed unit (DU) of the shared host network in communication with the radio unit recognizes the UE based upon a primary land mobile network (PLMN) identifier in an uplink message received via the RACH opportunity broadcast by the RU.

20. The automated process of claim 19 wherein the DU forwards the uplink message to a centralized unit (CU) that is associated with the guest network associated with the UE and that assigns bandwidth parts (BWPs) within the assigned portion of the spectrum to the UE for subsequent communications.

* * * * *